United States Patent [19]

Irwin

[11] Patent Number: 5,292,856

[45] Date of Patent: Mar. 8, 1994

[54] AROMATIC CONDENSATION POLYAMIDES WITH PENDANT ESTER AND AMIDE GROUPS

[75] Inventor: Robert S. Irwin, Wilmington, Del.

[73] Assignee: E. I. Du Pont de Nemours and Company, Wilmington, Del.

[21] Appl. No.: 44,013

[22] Filed: Apr. 8, 1993

[51] Int. Cl.$^5$ .................... G08G 69/32; G08G 69/12
[52] U.S. Cl. .................... 528/331; 528/184; 528/310
[58] Field of Search .............. 528/331, 184, 310

[56] References Cited

U.S. PATENT DOCUMENTS

| | | | |
|---|---|---|---|
| 3,386,965 | 6/1968 | Huffman et al. | 260/78 |
| 4,837,299 | 6/1989 | Peters et al. | 528/353 |
| 5,026,819 | 6/1991 | Irwin | 528/329.1 |
| 5,189,141 | 2/1993 | Irwin | 528/331 |
| 5,202,410 | 4/1993 | Irwin | 528/327 |

OTHER PUBLICATIONS

"Aromatic Copolyamides Containing Pendant Carboxyl Groups", Hinderer et al, Applied Polymer Symp., No. 21, 1-9 (1973).

Macromolecules 1985, 18, pp. 1058-1068.

*Primary Examiner*—Harold D. Anderson

[57] ABSTRACT

High molecular weight polyamides having benzidine linkages are prepared using certain substituted benzidine monomers.

6 Claims, No Drawings

AROMATIC CONDENSATION POLYAMIDES WITH PENDANT ESTER AND AMIDE GROUPS

BACKGROUND OF THE INVENTION

It has heretofore been a problem to incorporate benzidine in aramids without handling the monomer, a known carcinogen, The present process facilitates incorporation of such monomer into the polyamide chain by use of certain substituted benzidines. After the polyamide has been shaped, i.e., in the form of a fiber or film, the substituent may be driven off by pyrolysis. Certain of the polymers of the invention are capable of significant fiber tenacity increase on tensioned heat-treatment.

SUMMARY OF THE INVENTION

This invention provides a new group of polyamides comprising repeat units of the formula

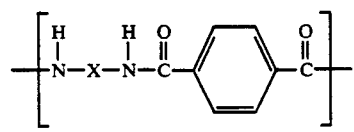

and/or

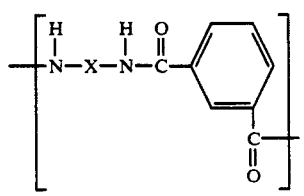

where X is

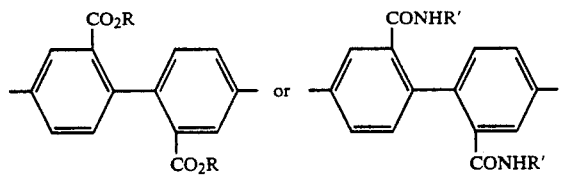

and mixtures thereof with from 2 to 95 mole % of

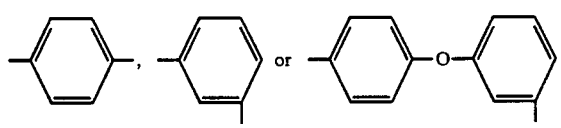

where R is alkyl or aralkyl and R' is methyl or ethyl.

DETAILED DESCRIPTION OF THE INVENTION

The polyamides of the present invention are prepared by reaction in solution of terephthaloyl chloride and/or isophthaloyl chloride with one or more diamines including dihydrocarbyl -4,4'-diaminodiphenate wherein the hydrocarbyl group is alkyl or aralkyl, preferably 1-6 carbon alkyl, and 4,4'-diamino-N,N'-dimethyldiphendiamide or 4,4'-diamino-N-N'-diethyldiphendiamide.

Preparation of dimethyl-4,4'-diaminodiphenate, diethyl-4,4'-diaminodiphenate, and 4,4'-diamino- N,N'dimethyldiphendiamide is disclosed in my U.S. Pat. No. 5,202,410 which is incorporated by reference.

As the additional diamines for preparation of copolymers, any of various other aromatic diamines may be employed, preferably, 3,4'-oxydianiline p-phenylene diamine (PPD) or m-phenylenediamine (MPD). Preferably, the diaminodiphenate or diphendiamide constitutes from about 2 to 20% (molar, based on total diamine). The terephthaloyl and/or isophthaloyl chloride should be employed in an amount substantially equivalent to the total diamine content of the reaction mixture.

The following examples are illustrative of the invention.

EXAMPLE 1

Poly(4,4'-dicarbomethoxy-4,4'-biphenylene) terephthalamide

In a dry resin kettle equipped with a cage-type stirrer, provision for external ice-water bath cooling, a slow current of dry nitrogen to exclude atmospheric moisture, and provision for addition of a solid reagent, dimethyl-4,4'-diaminodiphenate (8.37 g, 0.028 mole) was dissolved in a pre-prepared solution of anhydrous $CaCl_2$ (4.30 g) in anhydrous N-methylpyrrolidone NMP, (108 g). To this stirred solution, cooled at about 10° C., was quantitatively added terephthaloyl chloride (5.67 g; 0.028 mole). This briefly dissolved to give a clear solution but in less than a minute gelation set in; with continued stirring this was broken up to a rubbery crumb. After 2 hour stirring at ambient temperature, the crumb was treated with excess water to precipitate polymer, and then stirred with water at 80°-90° C. for 30 minutes to remove all retained solvent. Inherent viscosity in 100% sulfuric acid was 2.65. (The polymer retains NMP solvent extremely tenaciously such that, if the hot water treatment is omitted, the precipitate contains 7 mole NMP per repeat unit.) The polymer is almost amorphous (wide angle X-ray analysis shows a few crystals, apparent crystalline size of 10.6 Å .

EXAMPLE 2

Copolyterephthalamide of p-phenylene diamine (80 mole %) and dimethyl-4,4'-diaminodiphenate (20 mole %) and fiber therefrom As in Example 1, a solution of p-phenylenediamine (37.51 g, 0.35 mole) and dimethyl-4,4'-diaminodiphenate (26.05 g, 0.087 mole) in N-methyl-pyrrolidone (1008 g) containing anhydrous $CaCl_2$ (66.9 g) was treated with terephthaloyl chloride (88.14 g; 0.43 mole) to a crumb-like gel. Copolymer was isolated by treatment with hot water to provide 119 g copolymer, having inherent viscosity in $H_2SO_4$ of 6.01.

A solution of the copolymer (79.2 g) in 100% sulfuric acid (320.8 g), giving a 19.8% (w/w) solution, at 80° C., was extruded through a spinneret (10 holes; hole diameter, 0.005 mm), via a 0.64 cm air gap into a water bath at 0°-1° C., and fiber of approximately 4 dpf wound up at 90 m/min. The bobbins of yarn were soaked in water to extract all acid, and dried in air. The yarns were passed through a 45 m hot tube, in nitrogen atmosphere at various temperatures, under moderate tension; drawability was nil. Tensile properties of the fibers are shown in Table 1.

TABLE 1

| Heat Treatment | Filament Gauge (denier per filament) | Tenacity* (g/den) | Elongation (%) | Initial Modulus (g/den) |
|---|---|---|---|---|
| As-Spun | 4.1(3.8) | 13.1(13.6) | 6.1(6.3) | 485(448) |
| 400° C. | 4.6(4.6) | 11.7(12.2) | 6.4(6.9) | 358(375) |
| 450° C. | 4.0(3.4) | 12.6(13.8) | 3.8(3.8) | 527(568) |
| 500° C. | 3.5(3.4) | 8.0(9.5) | 1.6(1.9) | 559(588) |

*Highest tenacity in parenthesis

EXAMPLE 3

Copolyterephthalmaide of p-phenylene diamine (90 mole %) and dimethyl-4-4'-diaminodiphenate (10 mole %) and fibers therefrom Copolymer was prepared, as in Example 2. Inherent viscosity in sulfuric acid was 2.69. Spinning solution at 19.8% solids was spun as in Example 2 to a filament denier of about 2.5 at a wind-up rate of 70 m/min. They were held, under modest tension by hand over a 5 cm hot plate at various temperatures. Tensile data are shown in Table 2.

TABLE 2

| Heat Treatment | Filament Gauge (d/fil) | Tenacity (g/den) | Elongation (%) | Initial Modulus (g/den) |
|---|---|---|---|---|
| As-Spun | 2.6(2.7) | 7.9(9.3) | 3.2(4.1) | 480(491) |
| 375° C. | 2.5(2.4) | 12.1(13.2) | 2.3(2.5) | 677(670) |
| 400° C. | 2.3(2.4) | 13.5(14.8) | 2.4(2.8) | 741(748) |
| 500° C. | 2.2(2.1) | 13.9(14.8) | 2.2(7.2) | 732(809) |

EXAMPLE 4.

Copolyterephthalamide of p-phenylene diamine (92.5 mole %) and diethyl-4-4'-diaminodiphenate (7.5 mole %)

In the same manner as Example 2, terephthaloyl chloride (40.6 g, 0.200 mole) was added to p-phenylenediamine (19.98 g, 0.185 mole) and diethyl-4,4'-diaminodiphenate (4.92 g, 0.015 mole) dissolved in N-methylpyrrolidone (320 ml) containing dissolved CaCl$_2$ (30.5 g, 0.277 mole). The crumb thus formed was treated with water (3×) in a blender to precipitate polymer which was then washed with water and then acetone, and dried at 180° C. Yield 46.5 g.

EXAMPLE 5

Copolyterephthalamide of 3,4'-oxydianiline (50 mole %) and diethyl-4-4'-diaminodiphenate (50 mole %)

As in Example 2, terephthaloyl chloride (10.312 g, 0.0508 mole) and diethyl-4,4'-diaminodiphenate (8.331 g, 0.0254 mole) in N-methylpyrrolidone (171 ml) containing dissolved CaCl$_2$ (10.84 g, 0.0704 mole). The product was a thick, rubbery gel. Moieties of polymer, precipitated in water, gave $\eta_{inh}$=3.37 in NMP and 2.31 in sulfuric acid.

The foregoing solution was diluted by mixing with NMP (400 ml) at 80° C., to a 4.8% solution, which gelled reversibly on cooling to room temperature. Clear, colorless films were obtained by casting this solution on a clean glass plate with a 0.01 inch doctor knife, evaporating the solvent during 3 hours/80° C., soaking in cold water at least 2 hours, and in hot water at least 15 minutes to extract CaCl$_2$ and residual HCl, and redrying at 80° C. while clamped around the edges to the plate. The film was shred into 6 mm wide strips and drawn by hand across a 2" curved, heated plate. Neither as-cast nor drawn films showed any crystallinity. Tensile properties are shown in Table 3.

TABLE 3

| | Drawn at Various Temperatures (Highest Tenacity in Parentheses | | | | |
|---|---|---|---|---|---|
| Heat Treatment/Draw | Tenacity (g/den) | Elongation (%) | Modulus (g/den) | den/fil | O.A. |
| As-Cast | 1.0 | 8.9 | 41 | 733 | 66° |
| 390° C./6X | 6.7(8.4) | 2.7(3.0) | 279(328) | | 45° |
| 415° C./11X | 5.2(5.2) | 2.6(2.6) | 201(182) | | 19.4° |

The erratic nature of the stress-strain curves from the test instrument showed that within the test samples fibrils were breaking sequentially so that measured tenacities were not true reflections of an actual fiber tenacity. Draw performance was limited by thermal stability (softening) of the copolymer.

EXAMPLE 6

Copolyterephthalamide of 3,4'-oxydianiline (50%), p-phenylenediamine (25%), and diethyl-4,4'-diaminodiphenate (25%)

Polymer and film were prepared by the same general procedure as Example 5. Inherent viscosity was 2.45 in NMP, 2.20 in sulfuric acid. Film strips had T/E/Mi, as cast, of 1.4 g/den/40%/32 g/den. Drawing (a) 6.5× at 350° C. and (b) 15× at 400° C. gave T/E/Mi, respectively, of 8.0(8.0)/4.7(4.1/196(247) and 6.4(10.0)/3.6(4.1)/239(277).

EXAMPLE 7

Poly[4,4'-(2,2'-di-N-methylcarboxamide) biphenylene terephthalamide], i.e., polyterephthalamide from 4,4'-diamino-N,N'-dimethyldiphendiamide A. Using the procedure of Example 1, a solution of 4,4'-diamino-N,N'-dimethyldiphendiamide (10.43 g, 0.035 mole) in NMP (113 g) was treated with terephthaloyl chloride (7.11 g, 0.035 mole). A clear viscous solution stage gave way to a pasty yellow gel. This was isolated with excess water, treated with hot water (90° C.) to remove residual solvent, filtered and dried. Inherent viscosity in sulfuric acid was 3.11.

B. When polymerization was repeated in NMP containing dissolved CaCl$_2$ (eg., 6.78 g, 0.062 mole) solubility was not improved. Inherent viscosity of polymer in sulfuric acid was 3.14. Pyrolytic decomposition set in at about 400° C. A smaller weight loss (6%) in a lower temperature range of 300°–400° C. would correspond to elimination of 1 ml MeNH$_2$.

I claim:

1. A polyamide comprising repeat units of the formula

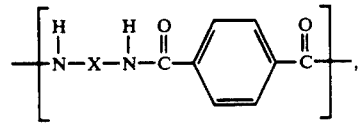

-continued

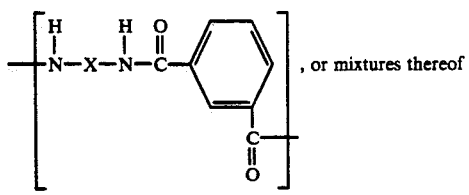, or mixtures thereof where X is

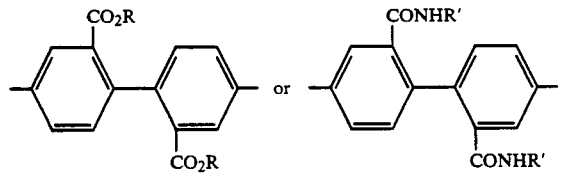

or mixtures thereof with from 2 to 95 mole % of

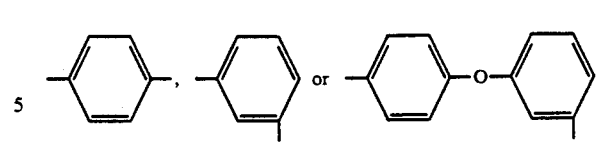

where R is alkyl or aralkyl and R' is methyl or ethyl.

2. A polyamide according to claim 1 wherein X is

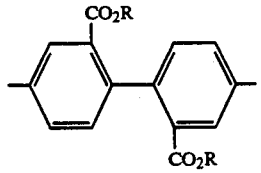

3. A polyamide according to claim 2 wherein R is methyl.
4. A polyamide according to claim 2 wherein R is ethyl.
5. A polyamide according to claim 1 wherein X is

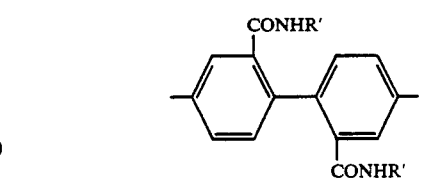

wherein R' is methyl or ethyl.
6. Fiber or film of the polyamide of claim 1.

* * * * *